3,440,055
NOVEL LECITHINS AND CHOCOLATE CONTAINING THE SAME

William A. Cleary, Somerset, N.J., and Paul A. Sartoretto, New York, N.Y., assignors to W. A. Cleary Corporation, New Brunswick, N.J., a corporation of New York
No Drawing. Filed Mar. 1, 1965, Ser. No. 436,327
Int. Cl. A23g 1/00; A23j 7/00
U.S. Cl. 99—23                  14 Claims

ABSTRACT OF THE DISCLOSURE

Disclosed is a method of fractionating lecithin, by extracting one volume of a mixture containing 30–85% by weight of acetone insoluble lecithin phosphatides, the balance being oil, with 0.5 to 2 volumes of alcohol to obtain a first alcohol extract. The first extract is separated and a second similar extraction is made on the insoluble residue. The second alcohol soluble extract is useful for reducing and stabilizing the viscosity of chocolate.

---

This invention relates to lecithin. More particularly, this invention is concerned with a novel process of producing and isolating various fractions of lecithin having unique characteristics.

Oils extracted or expressed from various vegetable products, such as corn or soybeans, contain about 2% phosphatides comprising lecithin, cephalin and inositol phosphatides. Commercial lecithin is generally precipitated from the oil by passing steam or water into the oil. After centrifuging, the precipitated lecithin may contain various amounts of oil such as from about 25% by weight to higher amounts up to 100%. It generally contains 65 to 75% phosphatides and the remainder is primarily a mixture of vegetable oil plus some free vegetable fatty acid. The phosphatides are insoluble in acetone. When extracted with acetone, the oil and fatty acids are removed and the remainder is referred to as acetone insolubles (A.I.). The A.I. percentage is thus approximately the percent of mixed phosphatides in lecithin. The resulting crude lecithin has a variety of uses because of its emulsifying properties, some uses being in margarine, chocolate and confectionery products.

Although the crude lecithin in oil has many uses it has been previously separated into fractions in the hope of obtaining isolates with special properties. The process of making the fractions was to remove the oil and fatty acids from the lecithin by acetone extraction and then extract the oil-free acetone insolubles (A.I. or lecithin) with methanol. Methanol-soluble and methanol-insoluble lecithin fractions are obtained. As shown in Mattikow United States Patent No. 2,640,780 the lecithin fractions have different emulsifying propreties.

Lecithin fractions made in this way from oil-free soybean lecithin using methanol extractions followed by the addition of soybean oil to the fractions to give 60% A.I. gave the results in Table 1 in a chocolate coating:

TABLE 1

| | First methanol extract (deg.) | Second methanol extract (deg.) | Methanol insoluble residue (deg.) |
|---|---|---|---|
| Coating viscosity control | 165 | 165 | 165 |
| Coating viscosity after addition of 0.3% lecithin fraction (60% A.I.) | 112 | 112 | 120 |
| Coating viscosity after addition of 0.5% lecithin fraction (60% A.I.) and 2.0% water | (¹) | (¹) | (¹) |

¹ No reading, too plastic.

Thus, fractions obtained by alcohol extraction of oil-free lecithin do not overcome the viscosity increasing effect of water in chocolate.

According to one aspect of the persent invention there is provided a novel process of producing lecithin fractions having unique emulsifying properties which comprises extracting one volume of a mixture of lecithin-in-oil, said mixture containing about 35 to 85% by weight of acetone insoluble phosphatides and the balance oil and free fatty acids, with a first amount of about 0.5 to 2 volumes of methyl alcohol, separating said alcohol extraction phase leaving a first residual phase of lecithin-in-oil, extracting the first residue from one volume of lecithin with about 0.5 to 2 volumes of a second quantity of methyl alcohol, separating the second alcohol extract from the second residual lecithin-in-oil phase, and removing the alcohol from the second alcohol extract to isolate the lecithin fraction therefrom.

The process leads to lecithin fractions which have unique properties attributable to the use of an oil-containing, rather than an oil-free, lecithin as the starting material. The lecithin fraction from the first methyl alcohol extraction is water dispersible and has excellent emulsifying properties in water-based foods such as soups, gravies, puddings, reconstituted milks and instant chocolates. The lecithin fraction from the second and subsequent alcohol extractions, when added in a very small amount to chocolate containing up to 2% water, greatly lowers the viscosity of the chocolate by overcoming the viscosity increasing property of water.

Athough methanol can be replaced in the process by ethanol or other lower aliphatic alcohols having up to three carbons, methanol is the most suitable to use, avoids government restrictions on ethanol, is least expensive and gives lecithin fractions most suitable for the intended purposes. The lecithin fractions, however, are producible using the other alcohols. Anhydrous methyl alcohol is advisably used.

Vegetable oils, such as those from which lecithin is obtained, are not very soluble in lower alcohols such as methanol, but the solubility of oils in methanol is increased in the presence of phosphatides. Less oil than lecithin is dissolved in the alcohol during the extraction so the A.I. values are higher for the extracts than the residue or the starting material except when the alcohol extraction is conducted at increased (60° C.) temperatures rather than about ambient temperature. Oil is added to the extracted lecithin fractions to obtain workable mixtures which generally will contain no more than about 60–65% A.I. The oil content of a particularly useful product is about 20%. Undoubtedly the oil functions as a second solvent to effect the fractionation because during the extraction there are two liquid layers, the upper layer alcohol saturated with oil and the lower layer oil saturated with alcohol. Each of the components of the total vegetable phosphatides is distributed into these layers according to its own partition coefficient under the conditions of extraction.

The amount of free fatty acids present in the lecithin-in-oil used as the starting material has an effect on the results obtained. As the free fatty acid content increases, the water solubility of the first and second methyl-alcohol extraction fractions decreases. Thus, a lecithin-in-oil having about 15 to 16% free fatty acids upon extraction gives a first lecithin fraction that is just barely water soluble and a second fraction that is not water dispersible. It is advisable in practicing this invention to employ a lecithin-in-oil having about a 10% or less free fatty acid content with a practical maximum being about 12%.

The carrier oil in the lecithin-in-oil starting material can be any suitable edible oil but advisably in the same oil from the vegetable source from which the lecithin is obtained. Thus, when soybean lecithin is used the oil is advisably soybean oil. However, an oil-free crude lecithin can be mixed with an oil and the mixture used as the starting material.

The alcohol extractions can be effected at temperatures from ambient to 60° C. Lower or higher temperatures are not needed and serve no purpose.

The number of alcohol extractions can be one or more depending upon the emulsification characteristics desired of the fractions. Generally, three fractions can be conveniently made. The first alcohol extraction fraction (FX) can be dispersed in water with ease. It is far more effective in producing oil-in-water emulsions than regular soybean lecithin. The second and subsequent alcohol extraction fractions (the SX fractions) can be dispersed in water only slowly but are still more hydrophilic than regular lecithin. The alcohol-insoluble fraction (UX) is more lipophilic than regular soybean lecithin. It is very efficient for producing water-in-oil emulsions such as margarine and peanut butter.

Chemically, the most alcohol-soluble fraction is rich in phosphatidyl cholin and is essentially free of inositol phosphatides. The second and subsequent alcohol extraction fractions are composed mainly of phosphatidyl cholin and phosphatidyl ethanolamine. The alcohol-insoluble residue is rich in inositol phosphatides.

The lecithin fraction obtained by alcohol extraction which has the least effect on lowering the viscosity of chocolate coatings containing a small amount of moisture is the first alcohol soluble extract fraction (FX) from the lecithin-in-oil. The lecithin residue remaining after the first alcohol extraction lowers the viscosity far more.

The first alcohol soluble fraction (FX) is water dispersible. It can be diluted with soya oil, glycerine, propylene glycol, or other suitable edible carrier to a convenient phosphatide percentage, preferably 55 to 65%. In this form it has multiple food applications which make it desirable over regular commercial lecithin.

It has the ability to smooth out creamed soups such as cream of tomato, cream of potato and cream of mushroom. As little as 0.1% of the FX fraction added to the soup concentrate emulsifies the fat globules to give the soup a smooth creamy consistency.

The water dispersible FX fraction can be mixed with water and carriers such as vegetable gums, starches, or cereal flour and the whole mass can be spray dried. The result is a dry, free flowing powder containing the water dispersible alcohol soluble fraction. The ratio of lecithin to carrier in the powder conveniently can be about 1:2 or 1:3. The dry powder can be used as an emulsifier in dry soups, gravies, instant and cooked puddings and gelatin desserts.

The alcohol soluble, water dispersible FX lecithin can be added to cocoa powder to the extent of 1 to 2% thereby rendering the cocoa powder readily dispersible in cold milk. When the dispersible cocoa powder is mixed with sugar the mixture becomes an instant cocoa beverage which disperses readily in cold milk.

Spray-dried skim milk powder disperses readily in water to form non-fat skim milk, but spray-dried whole milk powder does not disperse well because of the butter fat present. The addition of 0.25% to 0.5% of the FX fraction to concentrated whole milk, condensed milk, sweetened condensed milk, or reconstituted milk made from whole milk solids or from dry skim milk solids, creamery butter and water followed by spray drying results in the formation of a readily water-dispersible spray-dried whole milk.

The alcohol soluble water dispersible FX fraction can also be mixed with mono- and diglycerides of hydrogenated vegetable oils or animal fats and the resultant mixture used as such, or the mixture spray dried and mixed with vegetable gums, starch, or cereal flour to form a free-flowing powder with excellent emulsifying properties, which can be added to dry soup mixes, dry gravies, dry gelatin mixes, or dry instant puddings, and the like to impart smoothness and body which renders the products more appetizing and flavorable.

The alcohol-soluble lecithin fractions obtained from second and/or third extractions (SX) lower the viscosity of chocolate coatings more than the alcohol-insoluble residue (UX) remaining after one or more alcohol extractions, or the first alcohol-soluble fraction. A mixture of the fractions from the second and subsequent alcohol extractions (SX) with lecithin from the alcohol-insoluble residue (UX) also greatly reduces the viscosity of chocolate containing up to about 2% by weight of water. About one part by weight of the lecithin fractions from the second and subsequent alcohol extractions can be mixed with from a minor amount up to three parts by weight of the alcohol-insoluble residue.

The lecithin fractions are obtained from the extraction process with increased percentages of lecithin. In order to facilitate use of the fractions it is advisable to cut or dilute the fractions with oil, propylene glycol, or a mixture of such materials, to bring the fractions to an acceptable fluidity.

The viscosity reduction does not take place immediately after the lecithin fractions are added to chocolate containing water. Up to 48 hrs, may be required to obtain maximum viscosity reduction. Also, heating the chocolate during this period, such as at 120° F. or some other appropriate temperature, may be used to further induce the viscosity reduction.

The capacity of reducing chocolate viscosity in the presence of moisture finds many uses such as in coating ice cream bars. Through the dipping of uncoated ice cream bars in a liquid chocolate covering, moisture gets into the covering and causes it to thicken. As a result coating thickness cannot be maintained uniform or controllable because of the increased viscosity of the coating. By adding the lecithin fraction as hereby provided control of the chocolate viscosity and coating is achieved.

The amount of the SX lecithin fraction, alone or together with the UX lecithin fraction, that can be added to chocolate containing up to 2% moisture to reduce the viscosity is not narrowly critical although generally from 0.05 to 0.5% by weight can be added with good results.

The high moisture containing chocolate to which the lecithin fraction can be added can have any appropriate composition but usually will contain about 30 to 65% fat, about 10 to 50% chocolate liquor, about 20 to 60% sugar and about 0 to 20% milk solids. Thus, the lecithin can be added to dark chocolate such as one composed of 45 lbs. of chocolate liquor, 55 lbs. of sugar and 14 lbs. of cocoa butter and to milk chocolate such as one composed of 12 lbs. of chocolate liquor, 50 lbs. of sugar, 12.5 lbs. of milk solids and 25.5 lbs. of cocoa butter. It can also be added to ice cream bar chocolate coatings, which typically have 60–65% fat.

Milk chocolate bars can also be produced containing 2% moisture by using the lecithin fraction since the milk need not be evaporated excessively to hold the moisture low.

The following examples are presented to illustrate the invention.

EXAMPLE 1

To 3,065 g. of 67% soybean lecithin in soybean oil (with about 10% of the total materials being free fatty acids) was added 3,050 ml. of anhydrous methanol (sp. gr. 0.8055 at 28° C.) with mixing at room temperature for about 0.5 hr. with a mechanical stirrer at medium speed. The mixture was settled into two layers and the upper (alcohol) layer siphoned off and settled overnight. Material which settled out from the alcohol was returned to the alcohol-insoluble residue.

The lecithin residue was extracted again with 3,050 ml. of methanol and the layers separated in the same way.

The methanol was removed from all fractions by distillation under vacuum. The yields were as shown in Table 2.

TABLE 2

| | Lecithin fraction yield |
|---|---|
| First methanol extraction (FX) _____ g__ | 341 |
| Second methanol extraction (SX) _____ g__ | 341 |
| Methanol-insoluble residue (UX) _____ g__ | 2,497 |

After adding 68 g. of soybean oil to the first extract, and 50 g. of soybean oil to the second extract, the fractions analyzed for lecithin content (A.I. or acetone insolubles) as shown in Table 3.

TABLE 3

| Lecithin fraction: | Acetone insoluble, percent |
|---|---|
| First extract (FX) _____ | 65.6 |
| Second extract (SX)_____ | 56.3 |
| Insoluble residue (UX) _____ | 60.7 |

EXAMPLE 2

One thousand grams of commercial fluid soybean lecithin containing 64.5% acetone insoluble materials and 35.5% soybean oil (with about 10% of the total materials being free fatty acids) was stirred vigorously with 1,000 ml. of anhydrous methanol with a mechanical stirrer at room temperature for 1 hr. The mixture was allowed to stand for 1 hr. so that two layers were clearly separated. The top alcohol layer was separated and the alcohol removed by vacuum distillation to give a residue containing the most alcohol-soluble phosphatides (FX). Its weight was 137 g. and contained 59% of acetone insoluble materials.

The lower oil layer was extracted again with 1,000 ml. of anhydrous methanol by the same procedure. The extract this time contained the intermediate alcohol-soluble phosphatides (SX). Its weight was 141 g. and contained 74% acetone insoluble materials.

The lower oil layer was again extracted with 1,000 ml. of anhydrous methanol by the same procedure. The lecithin fraction (UX) weighed 102 g. and contained 74% acetone insoluble materials.

The lower oil layer was then vacuum distilled to remove all the methanol. The residue contained the least alcohol-soluble phosphatides, mostly inositol phosphatides. It weighed 620 g. and contained 59% acetone insoluble materials.

EXAMPLE 3

One thousand grams of a commercial fluid soybean lecithin containing 65% acetone insoluble materials was vigorously stirred with 2,000 ml. of anhydrous methanol at 60° C. for 1 hr. The mixture was allowed to stand at 60° C. until two layers were clearly separated. The alcohol upper layer was separated and allowed to cool to 30° C. An insoluble layer formed at this temperature and was separated. After the removal of alcohol by vacuum distillation, it weighed 168 g. and contained 61.2% acetone insoluble materials. The alcohol solution at 30° C. was freed of alcohol by vacuum distillation. The residue weighed 315 g. and contained 74.6% acetone insoluble material. The lower oil layer was also freed of methanol. It then weighed 518 g. and contained 60.7% acetone insoluble materials.

EXAMPLE 4

One thousand grams of a commercial fluid soybean lecithin containing 69.4% acetone insoluble materials was vigorously stirred with 2,000 ml. of anhydrous methanol at 60° C. for 1 hr. The mixture was allowed to cool to 35° C. and the two layers that formed were separated. The upper layer contained the more alcohol-soluble phosphatides. It was freed of alcohol by vacuum distillation. It weighed 460 g. and contained 46.6% acetone insoluble materials. The lower layer contained the less alcohol-soluble phosphatides. After the methanol was removed by vacuum distillation, it weighed 540 g. and contained 76.9% acetone insoluble materials.

EXAMPLE 5

The viscosity lowering capacity of the second alcohol extraction lecithin fraction (SX) was tested and compared with commercial lecithin using a very high grade fondant conched dark chocolate coating sold as Wilburs' Prize Medal Coating. Pertinent properties of the coating are: conched for 72 hrs. at 180–185° F.; particle size— liquor to .0018 to .0022 in., and paste to .0004 in.; lecithin free; total fat content approximately 35.8%. Viscosity determinations were made in accordance with the National Confectioners Association Standards using a McMichael viscosimeter. The amounts of lecithin stated include 35 to 40% soybean oil. The results are given in Table 4.

TABLE 4.—CHOCOLATE COATING VISCOSITY

| | Commercial Lecithin (deg.) | Second methanol extraction fraction (SX) [1] (deg.) |
|---|---|---|
| Coating viscosity-control no lecithin | 165 | 165 |
| 0.1% lecithin added to coating_____ | 110 | 108 |
| 0.2% lecithin added to coating_____ | 98 | 98 |
| 0.3% lecithin added to coating_____ | 85 | 76 |

[1] SX fraction obtained as in Example 1.

The 0.3% addition of the second methanol extraction lecithin fraction (SX) lowered the viscosity appreciably and the reduction is economically important because considerable addition of cocoa butter is required to drop the viscosity an equal amount. Furthermore, the use of lecithin instead of cocoa butter maintains the conche character, protects the coating against free moisture contamination and gives greater adhesion to centers whether the coating be hand dipped directly or blended for flavor with other coatings of lower viscosities.

The viscosity of the same chocolate coating was tested after the addition of commercial lecithin and the various lecithin fractions as obtained according to Example 1, with and without the addition of water. The amounts of lecithin added contained about 35 to 40% soybean oil. The results obtained are given in Table 5.

TABLE 5

| | Commercial Lecithin (deg.) | First methanol fractioned lecithin (FX) (deg.) | Second methanol fractioned lecithin (SX) (deg.) | Methanol insoluble lecithin (UX) (deg.) | Mixture: ⅓ SX and ⅔ UX (deg.) |
|---|---|---|---|---|---|
| Coating viscosity control [1]___ | 165 | 165 | 165 | 165 | 165 |
| 0.3% lecithin_____ | 85 | 110 | 76 | 93 | 88 |
| 0.5% lecithin plus 2.0% water_ | 152 | 180 | 76 | 165 | 100 |

[1] With 2% water the viscosity is too high to measure.

The data shows that, while all the fractions of lecithin lower the viscosity of chocolate, the lecithin fraction (SX) from the second methanol extraction gives far superior results when moisture is present. The data also shows that a 1:2 mixture by weight of the second methanol extraction lecithin fraction with the methanol-insoluble lecithin residue reduces the viscosity greatly even when water is present. The use of such a mixture is advantageous because far more of the UX residue, than of the SX fraction, is obtained in the process. Such a mixture thus permits the use of substantial amounts of the UX residue which alone does not reduce the viscosity of water-containing chocolate enough.

EXAMPLE 6

Crude soybean lecithin-in-oil containing 35, 65 and 85% acetone insolubles were extracted with methanol to obtain various lecithin fractions. The 65% lecithin was extracted with different ratios of alcohol to lecithin-in-oil. The resulting lecithin fractions were diluted with soybean oil when necessary to give a workable 60% A.I. material. The results are reported in Table 6.

volume of a mixture of lecithin-in-oil, said mixture containing about 35 to 85% by weight of acetone insoluble phosphatides and the balance oil, with a first amount of about 0.5 to 2 volumes of methyl alcohol, separating said first alcohol extraction phase leaving a first residual phase of lecithin-in-oil, extracting one volume of said first residue with about 0.5 to 2 volumes of a second quantity of methyl alcohol, separating the second alcohol extract from the second residual lecithin-in-oil phase, removing the alcohol from the second alcohol extract to isolate the lecithin fraction therefrom and recovering said lecithin fraction.

2. The process of claim 1 in which the lecithin and oil have the same vegetable source.

3. The process of claim 1 in which a vegetable oil is added to the lecithin fraction from the second alcohol extract to dilute it to a usable fluidity.

4. The process of claim 1 in which the second residual lecithin-in-oil phase is distilled to remove the alcohol.

TABLE 6

| Sample | Wt. of lecithin | A.I. | | Chocolate viscosity [1] after adding following amounts of lecithin [2] | | | |
|---|---|---|---|---|---|---|---|
| | | Percent A.I. in extract | Percent A.I. after oil is added | 0.1% | 0.2% | 0.3% | 0.4% |
| 65 A.I. extracted 0.5:1: [3] | | | | | | | |
| Control | | 64 | | 114 | 92 | 101 | |
| 1st extract | 8.9 | 73 | 60.0 | 118 | 97 | 101 | |
| 2nd extract | 5.1 | 78 | 56.2 | 111 | 91 | 101 | |
| 3rd extract | 4.4 | 81 | 56.3 | 120 | 112 | 115 | |
| 4th extract | 4.4 | 84 | 58.0 | 137 | 119 | 125 | |
| Residue | 56.0 | 58 | 58.1 | 116 | 112 | 115 | |
| 65 A.I. extracted 1:1: [3] | | | | | | | |
| 1st extract | 14 | 59 | 63 | 140 | 128 | 120 | |
| 2nd extract | 14 | 74 | 61 | 116 | 93 | 75 | |
| 3rd extract | 14 | 74 | | | | | |
| Residue | 62 | 59 | 59 | 140 | 120 | 115 | |
| 65 A.I. extracted 2:1: [3] | | | | | | | |
| 1st extract | 12.8 | 84 | 63.78 | 135 | 125 | 100 | 120 |
| 2nd extract | 11.2 | 83 | 60.5 | 130 | 118 | 105 | 120 |
| Residue | 48.0 | 55 | 55.5 | 134 | 120 | 110 | 118 |
| 35 A.I. extracted 1:1: [3] | | | | | | | |
| 1st extract | 9.2 | 81 | 66.3 | 145 | 123 | 110 | 115 |
| 2nd extract | 6.5 | 78 | 61.6 | 133 | 133 | 114 | 120 |
| Residue | 76.0 | 25 | | 139 | 129 | 109 | 113 |
| 85 A.I. extracted 1:1: [3] | | | | | | | |
| 1st extract | 13 | 98 | 45.7 | 131 | 112 | 98 | 105 |
| 2nd extract | 14 | 88 | 43.0 | 131 | 108 | 100 | 110 |
| Residue | 70 | 53 | 53.5 | 144 | 113 | 105 | 115 |

[1] The chocolate viscosity without lecithin was 160.
[2] Lecithin added contained stated percent A.I. after oil addition to fraction.
[3] Vol. of methanol to vol. of lecithin-in-oil.

EXAMPLE 7

The viscosity reducing power of the lecithin fraction (SX) from the second methanol extraction (as in Example 1) was tested on milk chocolate in the presence of moisture. Viscosity readings were at 120° F. on a McMichael Viscosimeter. The results obtained are given in Table 7.

TABLE 7

| | Milk chocolate | |
|---|---|---|
| | Hershey | Nestles |
| Control chocolate, no lecithin | 330 | 400 |
| 0.3% SX | 70 | 90 |
| 0.1% SX | 100 | 183 |
| 0.1% SX plus 0.5% water | 230 | (¹) |
| 0.1% SX plus 0.9% water | 425 | |
| 0.3% SX plus 0.9% water | 175 | |
| 0.3% SX plus 0.5% water | | 245 |
| 0.3% SX plus 0.8% water | | 380 |
| 0.4% SX plus 0.8% water | | 260 |

¹ No reading too high.

The foregoing detailed description has been given for clearness of understanding only, and no unnecessary limitations should be understood therefrom, as modifications will be obvious to those skilled in the art.

What is claimed is:
1. The process which comprises extracting about one

5. The lecithin fraction obtained from the first alcohol extraction phase according to claim 1.

6. The lecithin fraction obtained from the second alcohol extract according to claim 1.

7. The lecithin fraction obtained from the process of claim 4.

8. A mixture of one part by weight of the lecithin fraction according to claim 6 with up to three parts by weight of the lecithin fraction according to claim 7.

9. The process according to claim 1 in which the alcohol extractions are effected at a temperature from ambient temperature to 60° C.

10. The process which comprises extracting about one volume of soybean lecithin in soybean oil containing about 35 to 85% by weight of acetone insoluble phosphatides and the balance oil and free fatty acids with a first amount of about 0.5 to 2 volumes of methyl alcohol, separating said alcohol extraction phase leaving a first residual phase of lecithin-in-oil, extracting one volume of said first residue with about 0.5 to 2 volumes of a second quantity of methyl alcohol, separating the second alcohol extract from the second residual lecithin-in-oil phase, and recovering the second alcohol extract.

11. The process of claim 10 in which the second residual lecithin-in-oil phase is distilled to remove the alcohol.

12. The process of claim 10 in which the second alcohol extract is distilled to remove the alcohol.

13. A viscosity stabilized chocolate, capable of containing up to 2% by weight of water without an undue increase in viscosity, said chocolate containing an isolated lecithin fraction in an amount up to 0.5% by weight, said lecithin fraction produced by extracting about one volume of a mixture of lecithin-in-oil, said mixture containing about 35 to 85% by weight of acetone insoluble phosphatides and the balance oil and fatty acids, with a first amount of about 0.5 to 2 volumes of a lower aliphatic monohydric alcohol containing from one to three carbons, separating said first alcohol extraction phase leaving a first residual phase of lecithin-in-oil, extracting one volume of said first residue with about 0.5 to 2 volumes of a second quantity of such an alcohol, separating the second alcohol extract from the second residual lecithin-in-oil phase, and removing the alcohol from the second alcohol extract thus isolating the lecithin fraction therefrom.

14. A viscosity stabilized chocolate, capable of containing up to 2% by weight of water without an undue increase in viscosity, said chocolate containing from about 0.05 to 0.5% by weight of an isolated lecithin fraction produced by extracting about one volume of soybean lecithin in soybean oil containing about 35 to 85% by weight of acetone insoluble phosphatides with the balance oil and fatty acids with a first amount of about 0.5 to 2 volumes of methyl alcohol, separating said alcohol extraction phase leaving a first residual phase of lecithin-in-oil, extracting one volume of said first residue with about 0.5 to 2 volumes of a second quantity of methyl alcohol, separating the second alcohol extract from the second residual lecithin-in-oil phase, and removing the alcohol from the second alcohol extract thus isolating the lecithin fraction therefrom.

References Cited

UNITED STATES PATENTS

| | | | |
|---|---|---|---|
| 2,201,064 | 5/1940 | Thurman | 99—15 |
| 2,373,686 | 4/1945 | Julian et al. | 99—15 X |
| 2,640,780 | 6/1953 | Mattikow | 99—15 X |
| 2,724,649 | 11/1955 | Julian et al. | 99—15 X |
| 2,849,318 | 8/1958 | Julian et al. | 99—15 |
| 3,012,888 | 12/1961 | Davis et al. | 99—15 |

FOREIGN PATENTS 551,290    1/1958    Canada.

OTHER REFERENCES

Wik et al., Fractionation of Soybean Phosphatides with Isopropyl Alcohol, the Journal of the American Oil Chemists' Society, August 1952, pp. 345 to 347 (99–15).

A. LOUIS MONACELL, *Primary Examiner.*

D. M. NAFF, *Assistant Examiner.*

U.S. Cl. X.R.

99—15; 260—403